United States Patent

Marx

[11] 3,762,475
[45] Oct. 2, 1973

[54] DECREASING THE PERMEABILITY AND PRODUCING SUBTERRANEAN FORMATIONS
[75] Inventor: John W. Marx, Bartlesville, Okla.
[73] Assignee: Phillips Petroleum Company, Bartlesville, Okla.
[22] Filed: Oct. 21, 1971
[21] Appl. No.: 191,188

[52] U.S. Cl.................. 166/272, 166/292, 166/294
[51] Int. Cl............................................ E21d 43/24
[58] Field of Search.......................... 61/36 A, 36 R; 166/272, 292, 294

[56] References Cited
UNITED STATES PATENTS
2,319,020   5/1943   Van Leeuwen..................... 61/36 R OTHER PUBLICATIONS
Hawley, The Condensed Chemical Dictionary, 1971, P. 824.

Rogers, Composition and Properties of Oil Well Drilling Fluids, 1963, P. 414.

Primary Examiner—Marvin A. Champion
Assistant Examiner—Jack E. Ebel
Attorney—Young and Quigg

[57] ABSTRACT

A method for decreasing the permeability and producing a subterranean formation by injecting starch granules into the formation and thereafter increasing the temperature of the granules within the formation to a temperature at which at least a portion of the starch granules are caused to increase to a size greater than their size before heating.

15 Claims, 2 Drawing Figures

PATENTED OCT 2 1973 3,762,475

INVENTOR.
J. W. MARX
BY Young & Quigg
ATTORNEYS

DECREASING THE PERMEABILITY AND PRODUCING SUBTERRANEAN FORMATIONS

It is desirable to provide a method for effectively plugging portions of subterranean hydrocarbon containing formations and to provide a method for producing hydrocarbons from the formation. Further, it is also desirable to provide a method whereby the portion of the hydrocarbon containing formation plugged can be cleaned and a viscous flooding material established therein.

In summary, this invention resides in injecting starch granules into the formation and thereafter increasing the temperature of the granules to a temperature at which at least a portion of the starch granules are caused to increase to a size at least greater than their size before heating. Hydrocarbons can be produced from the formation by a secondary recovery means and the temperature of at least a portion of the granules can thereafter be heated to a temperature in excess of about 95° C. for dissolving a portion of the granules thereby forming a viscous flooding material.

Other aspects, objects, and advantages of the present invention will become apparent from a study of the disclosure, the appended claims, and the drawings.

The drawings are diagrammatic views of well bores and a subterranean formation upon which the methods of this invention are practiced.

Figure 1:
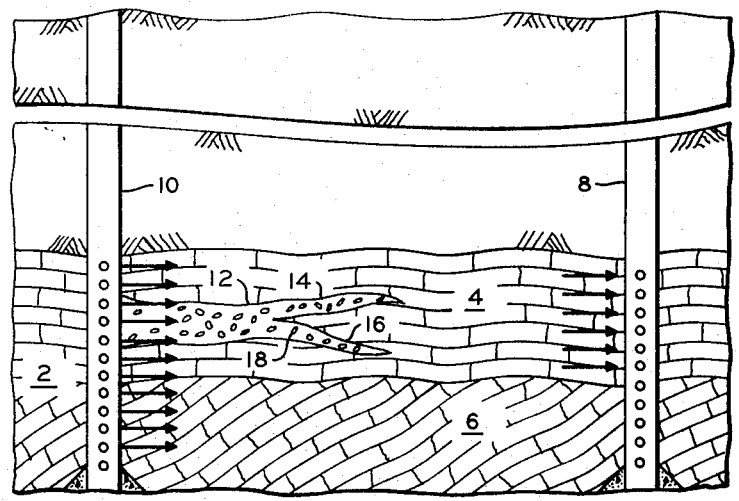
Figure 2:
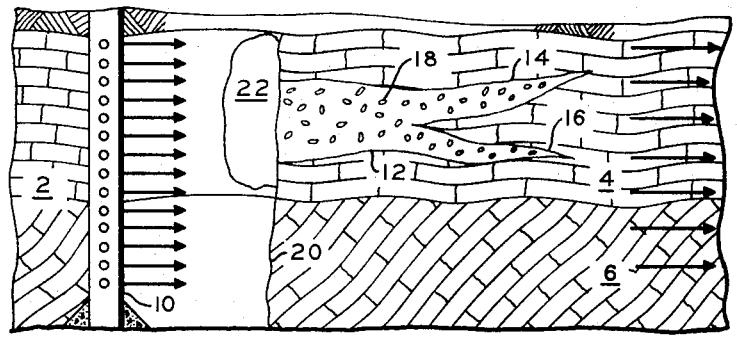

FIG. 1 shows the hydrocarbon-containing formation, well bores penetrating said formation, and the plugging of this invention and FIG. 2 shows forming of the viscous material in the formation.

Referring to FIG. 1, a subterranean hydrocarbon containing formation 2 has a first formation portion 4 of higher permeability than a second formation portion 6, for example. The formation 2 is penetrated by a production well 8 and an injection well 10 spaced from said production well 8. The wells can be open completions, cased through, or of other types known in the art and can have tubing hung in the wells or set through packers or equipped in other manners as known in the art.

This invention is particularly useful in secondary recovery projects to prevent fingering with resultant early breakthrough of the flooding medium to the production well 8, but it should be understood that the plugging method can be utilized for plugging of the subterranean formation for any purpose.

In the method of this invention, starch granules, preferably having a size in the range of about 5 to about 32 microns, are injected into the formation 2. It has been found that if the largest particles of the injected starch granules have sizes within the range of about 1.1 to about 2.5 times a medium pore size of the formation portion desired to be plugged, that said material will more efficiently fill the pore spaces to a greater radial distance from the well bore through which injected, for example the injection well 10.

Starch granules that can be utilized with the method of this invention are, for example, of the following starch types: rice, corn, wheat, tapioca, sago, arrowroot, barley, and potato, among others. Rice starch is the preferred starting material for use in this invention because it has the smallest average particle size (typically about 4.5 microns) and the most narrow size distribution (typically 3–6 microns) of any natural starch. When starting with these small, essentially uniform particles, an operator can accommodate a wide variety of permeability situations or differences by control of swelling conditions.

The starch granules are mixed with a carrier fluid and injected into and through the well bore to a location within the formation 2. The preferred mixture for injecting the starch granules into the formation comprises about 1,000 to about 5,000 parts per million starch granules in brine having greater than about 50,000 parts per million NaCl. With less starch granules the formation pores are not generally satisfactorily filled by the starch granules and at greater than 5,000 parts per million there is often premature plugging near the well bore. Also, at less than about 50,000 parts per million NaCl, brine bacteria may attack the starch granules and reduce their effectiveness, as known in the art.

The volume of the mixture injected into the formation is dependent upon the thickness of the formation desired to be plugged, the permeability, severity of fingering, and other factors known in the art. In practice, however, it is preferred that a slug of the first material being about 100 to about 500 barrels of mixture per foot of thickness desired to be selectively plugged should be initially injected. As is also known in the art, the further the slug is desired to be positioned laterally from the well bore, the greater the volume of mixture that should be injected.

After the starch granules have been injected into the formation and moved to their desired location relative to the well bore, the temperature of the granules within the formation 4, for example, is increased to a temperature at which at least a portion of the starch granules, preferably substantially all of the starch granules of the first injected mixture, are caused to increase to a size greater than their size prior to heating.

The size increase of the starch granules relative to the amount of heating and the salt content of the mixture can easily be determined by one skilled in the art. The following is example data for rice starch granules:

| NaCl content (wt. percent) | Initial particles (microns) | Terminal particle size after heating (microns) | | | | | | |
| --- | --- | --- | --- | --- | --- | --- | --- | --- |
| | | 65° C. | 70° C. | 75° C. | 80° C. | 85° C. | 90° C. | 95° C. |
| 5 | 3–36 | 7–8 | 8–10 | 10–12 | 12–15 | 15–20 | 20–25 | 25–30 |
| 10 | 3–36 | 6 | 7–8 | 8–10 | 10–12 | 12–15 | 15–20 | 20–25 |

At greater than about 95° C., and to a lesser extent at lower temperatures, there is some conversion of starch to soluble starch hereafter referred to generally as dissolving of the starch granules.

By the increasing of the size of the starch granules while said starch granules are positioned within the pore spaces of the formation 4, the pore spaces are caused to be plugged with the starch granules tightly wedged into the pore spaces and thereby substantially completely sealing the pore spaces and maintaining the granules against dislocation therefrom.

The preferred heating medium is steam, however other heated fluids can be utilized. The rate of injection of the mixture is dependent upon many factors and the selectivity that is desired. This rate is easily determined by one skilled in the art from injectivity profile logging, core analysis and other means. As is known, the mixture will pass into the channels and fingers which offer the path of least resistance and which zone it is desirable to plug to establish a more complete flood front sweep if the rate of injection is not excessive for that particular formation.

FIG. 1 shows a steam flood wherein a channel 12 and accompanying fingers 14, 16 through a first formation portion 4 have had the starch granules 18 injected thereinto and heated to their enlarged condition as described above. The channel 12 and fingers 14, 16 are thereby selectively plugged and subsequent injection of the steam, for example, into the formation 2 through the injection well 10 causes hydrocarbons to pass through the formation 2 and into the production well 8 for recovery to the surface.

Referring to FIG. 2, as the steam front 20 moves through the formation 2, the temperature behind the steam front increases to a temperature in excess of about 95° C. This increase causes a portion of the starch granules to dissolve and form a viscous material 22 in the condensate water of the formation portion of 4. Continued injection moves this viscous material 22 through the formation thereby further sweeping hydrocarbons from the formation.

Where the heating medium is not steam, the temperature of injected fluid can be increased to form the viscous material 22.

As new channels and fingers develop, other slugs of the starch granules can be intermittently injected into the formation to plug the formation as described above.

By the methods of this invention, more uniform and greater sweep efficiences can be obtained, thereby avoiding the loss of valuable hydrocarbons by the by-passing of said hydrocarbons by the flood fronts. The method of this invention can also be utilized to selectively plug a gas cap and prevent the entry of water encroachment by plugging the formation adjacent a producing well.

Other modifications and alterations of this invention will become apparent to those skilled in the art from the foregoing discussion and accompanying drawing, and it should be understood that this invention is not to be unduly limited thereto.

What is claimed is:

1. A method for decreasing the permeability of a subterranean hydrocarbon containing formation penetrated by at least one well bore and producing hydrocarbons from the formation, comprising:
   injecting a carrier fluid having starch granules downwardly through the well and into the formation, the largest of said starch granules being of a size in the range of about 1.1 to about 2.5 times a median pore size of the formation;
   increasing the temperature of the granules within the formation to a temperature in the range from that temperature at which at least a portion of the starch granules are caused to increase in size to an upper temperature of about 95° C.; and
   thereafter producing fluids entering the well bore.

2. A method, as set forth in claim 1, wherein the starch granules injected are of a size in the range of about 5 to about 32 microns.

3. A method, as set forth in claim 1, wherein the starch granules are dispersed in a carrier fluid comprising brine.

4. A method, as set forth in claim 1, wherein the starch granules are granules of rice starch.

5. A method for producing hydrocarbons from a subterranean hydrocarbon containing formation penetrated by at least one injection well and at least one production well spaced from said injection well, comprising:
   injecting a carrier fluid having starch granules into the formation, the largest of said starch granules being of a size in the range of about 1.1 to about 2.5 times a median pore size of the formation;
   increasing the temperature of the formation to a temperature in the range from that temperature at which at least a portion of the starch granules in the formation are caused to increase in size to an upper temperature of about 95° C.;
   injecting fluid into the injection well and outwardly through the formation; and
   producing fluids entering the production well.

6. A method, as set forth in claim 5, wherein the starch granules injected are of a size in the range of about 5 to about 32 microns.

7. A method, as set forth in claim 5, wherein the starch granules are dispersed in a carrier fluid comprising brine.

8. A method, as set forth in claim 5, wherein the starch granules are granules of rice starch.

9. A method, as set forth in claim 5, wherein heated fluid is injected into the formation for increasing the size of the starch granules; and
   continuing to inject heated fluid into the formation for moving hydrocarbons into the producing well.

10. A method, as set forth in claim 9, further including intermittently injecting other slugs of starch granules into the formation during the injection of fluid into and through the formation for moving hydrocarbons into the production well.

11. A method, as set forth in claim 9, including increasing the temperature of a portion of the enlarged starch granules in the formation to a temperature greater than about 95° C. for converting at least a portion of the starch granules to soluble starch.

12. A method for producing hydrocarbons from a subterranean hydrocarbon containing formation penetrated by at least one injection well and at least one producing well spaced from said injection well, comprising:
   Step 1 - injecting a carrier fluid having starch granules down the injection well and into the formation, the largest of said starch granules being of a size in the range of about 1.1 to about 2.5 times a median pore size of the hydrocarbon containing formation;
   Step 2 - injecting heated fluid downwardly through the injection well and outwardly through the formation into contact with the starch granules to heat the granules to a temperature in the range from that temperature at which at least a portion of the starch granules in the formation are caused to increase in size to an upper temperature of about 95° C. to alter the permeability of the formation;
   Step 3 - continuing to inject heated fluid through the formation to move a flood front and hydrocarbons through the formation toward the producing well and heat the starch granules to a temperature greater than 95° C.; and
   Step 4 - producing fluids entering the producing well.

13. A method, as set forth in claim 12, including adding at least one other volume of starch granules to the injected fluid of Step 3.

14. A method, as set forth in claim 12, wherein the heated fluid is steam.

15. A method, as set forth in claim 14, wherein the starch granules are dispersed in a carrier fluid comprising brine.

* * * * *

UNITED STATES PATENT OFFICE
CERTIFICATE OF CORRECTION

Patent No. 3,762,475           Dated   October 2, 1973

Inventor(s)   John W. Marx

It is certified that error appears in the above-identified patent and that said Letters Patent are hereby corrected as shown below:

Column 4, line 50, delete "outwardly through" and insert -- into --.

Signed and sealed this 2nd day of April 1974.

(SEAL)
Attest:

EDWARD M. FLETCHER, JR.　　　　　　　　C. MARSHALL DANN
Attesting Officer　　　　　　　　　　　　Commissioner of Patents